O. B. NORTH.
Snap-Hooks.
No. 140,531.  Patented July 1, 1873.
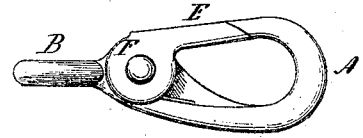
fig. 1
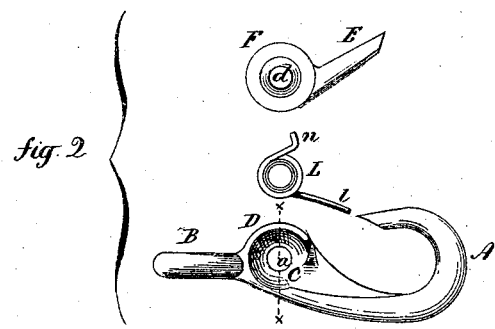
fig. 2
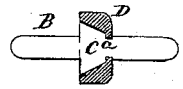 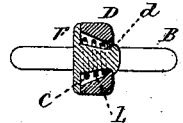
fig. 3  fig. 4
Witnesses
Oliver B. North
Inventor
By Atty.

UNITED STATES PATENT OFFICE.

OLIVER B. NORTH, OF NEW HAVEN, CONNECTICUT, ASSIGNOR TO O. B. NORTH & CO., OF SAME PLACE.

IMPROVEMENT IN SNAP-HOOKS.

Specification forming part of Letters Patent No. 140,531, dated July 1, 1873; application filed May 13, 1873.

*To all whom it may concern:*

Be it known that I, OLIVER B. NORTH, of New Haven, in the county of New Haven and State of Connecticut, have invented a new Improvement in Snap-Hooks; and I do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, the parts detached; Fig. 3, a transverse section on line $x$ $x$; and in Fig. 4, a transverse section on the same line, the parts attached.

This invention relates to an improvement in the manufacture of what are commonly termed snap-hooks or rein-snaps.

In the usual construction of these, it is necessary to cast the hook, spring-chamber, and loop in a different relative position to each other than that required when finished, in order that the pattern may draw from the sand.

The object of this invention is such a construction of the hook that the hook, spring-chamber, and loop may be all cast in their proper relative position to each other; and it consists in constructing the spring-chamber of a conical form, open upon one side, into which a conical spring is placed, and through which spring a conical stud, formed on the ear of the tongue, is passed and riveted upon the opposite side, the ear of the tongue closing the open side of the chamber, all as more fully hereinafter described.

A is the hook; B, the loop, in any of the usual or desirable forms. At the base of the hook, or between the hook and the ear, a conical chamber, C, is formed, as seen in Figs. 2 and 3. This chamber opens through the head D, as at $a$. This peculiar-shaped chamber enables the molding of the hook, loop, and chamber, all in proper relative position to each other, by simply laying the hook in an inclined position, so that the sand will draw freely from the conical chamber C, which cannot be done when the chamber is of the usual form. E is the tongue, shown detached in Fig. 2, and is formed with an ear, F, corresponding to the head D upon the hook, and upon this head is formed a stud, $d$, also of conical form, and which, when passed through the chamber C and perforation in the head, is riveted down upon the opposite side, so as to form a pivot upon which the tongue will turn. This stud is of smaller diameter than the chamber C, as seen in Fig. 4, so as to leave a space around the stud within the chamber. Before placing the tongue in position, a spring, L, shown detached in Fig. 2, is placed in the chamber. This spring is of conical form. An arm, $l$, from the smaller end bears upon the base of the hook, and the tongue rests upon another arm, $n$, from the larger end. The spring is coiled into conical form to correspond with the chamber, and placed in the chamber, the tongue secured, and the hook is complete.

The parts of the hook, except the spring, are cast, and after passing the tumbling-barrel are ready for use without other mechanical operations than those required for securing the parts together; thus I construct a hook of extreme simplicity and corresponding cheapness, and yet practically as perfect in operation and use as more expensive hooks.

I claim as my invention—

In a snap-hook having the hook A and loop B in the relative position to each other, as described, a conical chamber formed in the head to receive the conical spring, the tongue E constructed with the ear F and stud $d$, the said parts being united by means of the said stud, substantially as set forth.

OLIVER B. NORTH.

Witnesses:
SAMUEL BRACE,
GEORGE PARKER.